United States Patent
De Vos

(10) Patent No.: US 8,173,752 B2
(45) Date of Patent: May 8, 2012

(54) POLYMER COMPOSITION COMPRISING POLYLACTIDE

(75) Inventor: Siebe Cornelis De Vos, Arnhem (NL)

(73) Assignee: Purac Biochem B.V., Gorinchem (NL)

( * ) Notice: Subject to any disclaimer, the term of this patent is extended or adjusted under 35 U.S.C. 154(b) by 328 days.

(21) Appl. No.: 12/385,829

(22) Filed: Apr. 21, 2009

(65) Prior Publication Data

US 2009/0261510 A1 Oct. 22, 2009

Related U.S. Application Data

(60) Provisional application No. 61/071,306, filed on Apr. 21, 2008.

(51) Int. Cl.
*C08G 63/91* (2006.01)

(52) U.S. Cl. ........ 525/415; 525/410; 525/411; 525/450; 524/401; 524/437; 524/445

(58) Field of Classification Search .................. 525/410, 525/411, 415, 450; 524/401, 437, 445
See application file for complete search history.

(56) References Cited

U.S. PATENT DOCUMENTS

| | | | |
|---|---|---|---|
| 2004/0110884 A1 | 6/2004 | Dontula et al. | |
| 2007/0032631 A1 | 2/2007 | Ouchi et al. | |
| 2008/0039579 A1 | 2/2008 | Kimura et al. | |
| 2008/0200600 A1* | 8/2008 | Schomaker et al. | 524/445 |

FOREIGN PATENT DOCUMENTS

| | | |
|---|---|---|
| EP | 1 681 316 A1 | 7/2006 |
| JP | A-2003-128900 | 5/2003 |
| WO | WO 2006/000550 A1 | 1/2006 |
| WO | WO 2006/058846 A1 | 6/2006 |

OTHER PUBLICATIONS

Sorrentino et al.; "Potential perspectives of bio-nanocomposites for food packaging applications;" *Trends in Food Science & Technology*; vol. 18 (2007); pp. 84-95.

Degee et al.; "Polylactides" Standard Article; *Kirk-Othmer Encyclopedia of Chemical Technology*; Copyright 2004 by John Wiley & Sons, Inc.; Article Online Posting Date: Jun. 18, 2004; pp. 1-25; XP-002493115.

Ray et al.; "New Polylactide/Layered Silicate Nanocomposites. 1. Preparation, Characterization, and Properties;" *Macromolecules*; vol. 35 (2002); pp. 3104-3110.

Cavani et al.; "Hydrotalcite-Type Anionic Clays: Preparation, Properties and Applications.;" *Catalysis Today*; vol. 11 (1991); pp. 173-301.

Bookin et al.; "Polytype Diversity of the Hydrotalcite-Like Minerals II. Determination of the Polytypes of Experimentally Studied Varieties;" Clays and Clay Minerals; vol. 41, No. 5 (1993); pp. 558-564.

\* cited by examiner

*Primary Examiner* — David W Wu
*Assistant Examiner* — Robert Jones, Jr.
(74) *Attorney, Agent, or Firm* — Oliff & Berridge, PLC

(57) ABSTRACT

The present invention pertains to a polymer composition comprising one of poly-D-lactide and poly-L-lactide bonded to an anionic clay mineral and the other of poly-D-lactide and poly-L-lactide not bonded to the anionic clay mineral. In a preferred embodiment, the anionic clay mineral is a hydrotalcite or a meixnerite.

The polylactide composition according to the invention combines a high polymerisation rate with a low amount of contaminants in the system.

15 Claims, No Drawings

POLYMER COMPOSITION COMPRISING POLYLACTIDE

This nonprovisional application claims the benefit of U.S. Provisional Application No. 61/071,306, filed Apr. 21, 2008.

The present invention pertains to a polymer composition comprising polylactide, to a process for producing said polymer composition, to shaped articles obtained from said composition, and to a method for manufacturing said shaped articles.

Polylactide is a biodegradable polymer which has recently attracted attention as general purpose biodegradable polymer. As the lactyl unit from which the polymer is derived has a chiral center, polylactide exists in a number of stereochemical configurations. Poly-L-lactide is built up from L-lactyl units; poly-D-lactide is built up from D-lactyl units. Polymers comprising both L-lactyl units and D-lactyl units are indicated as lactide-copolymers.

Depending on its stereochemistry, polylactide can be amorphous or semi-crystalline. The latter applies in particular to poly-D-lactide and poly-L-lactide homopolymers. However, the crystallisation rate of these polyesters is relatively low. This has a number of disadvantages, one of which is that in the case of injection moulding, it takes a long time for the composition to become sufficiently stiff by crystallisation to allow for easy mould release. Rapid polymer crystallisation allows for a short cooling time in the mould resulting in a short cycle time, which is desirable for commercial production of articles by injection moulding.

It has been found that the crystallisation rate of polylactide of one type of stereochemistry can be increased by the presence of minor amounts of polylactide of the other type, which leads to the formation of high-melting stereocomplex crystals via stereoselective association of the enantiomeric polymers.

European patent application No. 1681316 and counterpart US2007/0032631 describe a polylactide composition with an increased crystallisation velocity which comprises a polylactide-lamellar clay mineral bonded body consisting of a lamellar clay mineral and one of poly-L-lactic acid and poly-D-lactic acid bonded to the lamellar clay mineral, and the other of poly-L-lactic acid and poly-D-lactic acid not bonded to the lamellar clay mineral. The polymer bonded to the lamellar clay mineral will combine with the enantiomorph counterpart not bonded to the clay mineral to form stereocomplexes which act as nucleating agent in the crystallisation step. The lamellar clay mineral used in this publication is a cationic clay mineral such as smectite, montmorillonite, beidellite, kaolinite, vermiculite, or mica. The lamellar clay minerals are combined with organic onium compounds which comprise a hydroxylic group. The onium compounds are introduced into the interlayers between the clay platelets via ion-exchange. The thus-obtained clay mineral is combined with polymerisable monomers of lactic acid or lactide, and polymerised from the hydroxyl group of the organic onium salt.

It has been found that the process of EP 1681316 has a number of disadvantages. In the first place, the onium compound present in the lamellar clay will end up in the final product. Organic onium compounds of this type are prone to reaction with the polymer matrix, and may thus lead to degradation thereof. Discoloration of the polymer matrix may also occur. Further, the presence of onion-compounds is not attractive when materials are manufactured for medical or food purposes. Further, after elaborate desalinisation of the crude clay ore, the purified clay mineral has to be modified by a two-step process, reaction of the onium compound followed by reaction of the lactic acid, which in itself is not attractive.

The object of the present invention is to provide a polymer composition comprising polylactide with a high crystallisation rate and improved melt-compounding properties which does not suffer from the disadvantages of the process described in EP 1681316.

The present invention pertains to a polymer composition comprising one of poly-D-lactide and poly-L-lactide bonded to an anionic clay mineral and the other of poly-D-lactide and poly-L-lactide not bonded to the anionic clay mineral.

It is noted that WO2006/000550 describes a polymer-containing composition obtainable by the steps of preparing a mixture of an inorganic anionic clay and a cyclic monomer such as a cyclic ester like lactide, and polymerising said monomer. This reference describes nothing on the use of enantiomers.

US2004/0110884 describes clays intercalated with a block-copolymer, where the block copolymer comprises a hydrophilic block capable of intercalating the clay, and an oleophilic block such as polylactic acid. This reference describes nothing on the use of enantiomers.

JP2003-128900 describes PLA-based car-components comprising both D- and L-lactide. Use of one of these bonded to an anionic clay is not disclosed. Clays are disclosed as inorganic fillers, but only cationic clays.

US2008/0039579 describes a PLA obtained by mixing L-lactide polymer and D-lactide polymer, followed by heating. Hydrotalcite is mentioned as a possible binder. The use of one of these bonded to an anionic clay is not disclosed.

A. Sorrentino et al. (Trends in Food Science & Technology 18 (2007) 84-95) describe in general the various processing routes for manufacturing exfoliated or intercalated clay minerals, indicated as nanocomposites, and their use in biopolymers such as PLA. The issue of stereoselectivity is not addressed.

Kirk Othmer 2004 Chapter Polylactides (P. Degrée and P. Dubois) describes intercalation of clays with PLA by in situ synthesis. The use of D- versus L-PLA is not described.

S. S. Ray et al., New Polylactide/Layered Silicate Nanocomposites. 1. Preparation, Characterisation, and Properties, Macromolecules 2002, 35, 3104-3111, describe the manufacture of nanocomposites manufactured by melt-extrusion of PLA with montmorillonite.

The present invention will be elucidated below.

Anionic clays are layered inorganic (hydr)oxides wherein the inorganic (hydr)oxide layers comprise charge deficiencies which are compensated by charge-balancing anions. The charge-balancing anions may be situated in the interlayer between clay layers, on the edge of the clay layers, or on the outer surface of the stacked clay layers.

In hydrotalcite-like anionic clays the brucite-like main layers are built up of octahedra alternating with interlayers in which water molecules and anions, more particularly carbonate ions, are distributed. In general, the interlayers may contain anions such as nitrate, hydroxide, chloride, bromide, iodide, sulphate, sulphite, or organic anions like monocarboxylates such as acetate, dicarboxylates such as oxalate, and alkyl sulphonates such as laurylsulphonate. Hydrotalcite is an example of a naturally occurring anionic clay, in which carbonate is the predominant anion present in the interlayer. Meixnerite is an anionic clay wherein hydroxyl is the predominant anion present in the interlayer.

It should be noted that a variety of terms are used to describe the material which is referred to herein as an anionic clay. Hydrotalcite-like and layered double hydroxide are interchangeably used by those skilled in the art. Herein the materials are referred to as anionic clays, comprising within that term hydrotalcite-like and layered double hydroxyide materials. Together with hydrotalcite-like layered double hydroxides, bivalent and trivalent metal hydroxides and their hydroxy salts are actually anionic clays consisting of positively charged hydroxide layers with anions intercalated in the interlayer region. Within the present invention the use of hydrotalcite and meixnerite, in particular the use of meixnerite is preferred. The use of synthetic clay minerals is generally preferred over the use of natural clay minerals because in the synthesis of clay minerals the properties of the clay, including swelling properties, ion exchange capacity, particle size, and degree of stacking can be controlled.

Suitable anionic clays include those which meet the general formula:

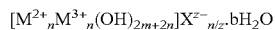

$$[M^{2+}{}_n M^{3+}{}_n(OH)_{2m+2n}]X^{z-}{}_{n/z}.bH_2O$$

wherein $M^{2+}$ is a divalent metal ion, such as a divalent ion of Zn, Mn, Ni, Co, Fe, and Mg, $M^{3+}$ is a trivalent metal ion, such as a trivalent ion of Al, Cr, Fe, Co, and Ga, m and n have a value such that m/n=1 to 10, and b has a value in the range of from 0 to 10. X is a charge-balancing ion, such as hydroxide, carbonate, bicarbonate, nitrate, chloride, bromide, sulfonate, sulfate, bisulfate, vanadate, tungstate, borate, phosphate, and pillaring anions such as those disclosed in WO2006/058846.

In one embodiment, $M^{2+}$ is a divalent metal ion of a metal selected from Zn, Fe, and Mg and mixtures thereof.

In one embodiment, $M^{3+}$ is a trivalent metal ion of a metal selected from Al, Fe, and mixtures thereof.

Anionic clays suitable for use in the present invention include hydrotalcite and hydrotalcite-like anionic clays, also called layered double hydroxides (LDH).

In a preferred embodiment, the charge-balancing ion X in the starting anionic clay comprises hydroxide, (mono or bi)carbonate, nitrate, sulfate and mixtures thereof.

In a preferred embodiment of the present invention the anionic clay meets the following general formula:

$$[Mg^{2+}{}_n Al^{3+}{}_n(OH)_{2m+2n}]X^{z-}{}_{n/z}.bH_2O$$

wherein m and n have a value such that m/n=1 to 10, preferably 1 to 6, more preferably 2 to 4, and most preferably a value between 2.5 and 3.5; b has a value in the range of from 0 to 10, generally a value of 2 to 6, and often a value of between 2.5 and 3.5; and X is a charge-balancing ion selected from hydroxide, carbonate, bicarbonate, and nitrate.

The anionic clay may have any crystal form known in the art, such as described by Cavani et al. (Catalysis Today, 11 (1991), pp. 173-301) or by Bookin et al. (Clays and Clay Minerals, (1993), Vol. 41 (5), pp. 558-564), such as 3H1, 3H2, 3R1, or 3R2 stacking.

Anionic clay minerals are built up of clay platelets. The degree of stacking of the clay platelets may be a measure for the accessibility of the space between the layers. In one embodiment of the present invention it is preferred for the anionic clay to have a degree of stacking not exceeding 20 sheets per stack. This parameter can be determined by means of transmission electron microscopy and XRD. In a particularly preferred embodiment, the average degree of stacking of the clay platelets is not more than 10 platelets per stack, more preferably not more than 5 platelets per stack, and most preferably not more than 3 platelets per stack. The lower limit, needless to say, is constituted by unstacked clay platelets, which have a "degree of stacking" of 1.

In stacked clays, the accessibility of the interlayer will also depend on the distance between the individual clay layers. Preferably, the distance between the layers in an anionic clay-based according to the invention is at least 1.0 nm, more preferably at least 1.5 nm, and most preferably at least 2 nm.

The distance between the individual layers can be determined using X-ray diffraction from the position of the d(001) reflections.

In the present invention, use is made of a poly-L-lactide or poly-D-lactide bonded to an anionic clay. In the present specification the word "bonded" refers to the poly-L lactide or poly-D lactide being intercalated in the interlayer of the anionic clay. It is noted that the polymer being intercalated in the interlayer of the anionic clay has the advantage that a relatively large amount of polymer can be present per gram of anionic clay, which leads to an efficient use of resources. Moreover, intercalation with bulky polylactide macromolecules expands the clay's interlayers and weakens the coherent forces between the clay platelets, which results in easier delamination and dispersion of these organically modified clay platelets in a polymer or organic solvent.

In one embodiment, the poly-L-lactide or poly-D-lactide is intercalated in the interlayers of the anionic clay, and is bonded, via its end group, to charge-deficient sites on the clay platelets, e.g., via ion exchange.

While not wishing to be bound by any theory, it is believed that the effect of the present invention results from the formation of stereocomplex crystals between the polylactide of one stereochemistry bonded to the thus organically modified anionic clay and the polylactide of the opposite stereochemistry not bonded to the anionic clay. As the PLA stereocrystals have a melting point of at least 190° C., the presence of these materials results in a polymer composition with improved heat resistance. In one embodiment, the present invention thus also pertains to a composition comprising one of poly-D-lactide and poly-L-lactide bonded to an anionic clay mineral and the other of poly-D-lactide and poly-L-lactide not bonded to the anionic clay mineral, wherein the composition comprises PLA stereocomplexes with a melting point of at least 190° C.

To obtain this effect the polymer bonded to the anionic clay should have a certain degree of polymerisation.

One method to get a measure of the theoretical polymerisation degree of the polymer bonded to the anionic clay can be derived from the anion exchange capacity (AEC) of the anionic clay and the amount of monomer added to the system. Assuming complete polymerisation and assuming that anionic sites contribute to the polymerisation and that there are no other polymerisation starters in the system, the theoretical average degree of polymerisation (TADP) can be calculated from the following formula:

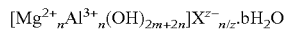

$$TADP = \frac{\text{moles of monomer/gram of anionic clay}}{AEC(\text{in equivalent/gram})}$$

It is preferred for the poly-L-lactide or poly-D-lactide bonded to the anionic clay to have a TADP of at least 6. In one embodiment, the TADP is at least 8, more in particular at least 10, expressed as lactyl-units.

The poly-D-lactide or poly-L-lactide bonded to the anionic clay generally has a maximum molecular weight of at most 50,000 gram/mole. If the molecular weight of the polymer comes above that value, the formation of stereocomplexes becomes less efficient. Expressed in another way, the composition generally has a TADP of at most 700, expressed in terms of lactyl-units.

The anionic clay with poly-D-lactide or poly-L-lactide bonded thereto may be manufactured in a number of manners.

In one embodiment, an anionic clay is mixed with the polymer, and the polymer is allowed to absorb onto the clay.

If so desired, this process can be carried out in a solution for the polylactide. It is also possible to carry out the adsorption process at increased temperature to improve the adsorption efficiency.

In another embodiment, an anionic clay is combined with lactide, and the lactide is polymerised to form a poly-L-lactide or poly-D-lactide.

In a further embodiment, an anionic clay is contacted with lactic acid, and the lactic acid is subjected to a polymerisation step.

The polymer composition according to the invention comprises polylactide bonded to the anionic clay and the enantiomorph not bonded to the anionic clay.

In one embodiment of the present invention, the polylactide not bonded to the anionic clay comprises a mixture of poly-D-lactide and poly-L-lactide. As compared to the use of poly-L-lactide alone, or poly-D-lactide alone, the use of this mixture is advantageous because it has a higher melting point and a higher crystallisation rate, which can be further improved by combining it with anionic clay in accordance with this invention. In this embodiment, in the mixture of poly-D-lactide and poly-L-lactide the ratio between the two enantiomorphs is generally between 99:1 and 1:99, preferably between 90:10 and 10:90, more preferably between 7:30 and 30:70, still more preferably between 40:60 and 60:40. When the difference in amounts between the two components is larger, it is believed that less stereocomplexes will be formed, and that therefore the effects obtained by the present invention will be less pronounced. In the embodiment where the polylactide not bonded to the anionic clay comprises a mixture, the polylactide bonded to the anionic clay may be poly-D-lactide or poly-L-lactide, whichever is preferred.

In another embodiment, the polylactide bonded to the anionic clay is poly-D-lactide, and the polylactide not bonded to the anionic clay is poly-L-lactide. Conversely, in another embodiment, the polylactide bonded to the anionic clay is poly-L-lactide, and the polylactide not bonded to the anionic clay is poly-D-lactide. Of these, the first option is preferred.

Where in the present specification mention is made of poly-L-lactide or poly-D-lactide, a lactic acid polymer is meant in which the content of the predominant lactic acid enantiomer (L or D) is at least 85 mol %. More preferably, the optical purity is at least 90 mol %, more preferably at least 95 mol %, most preferably at least 98 mol %.

The composition according to the invention generally comprises 0.01 to 30 wt. % of anionic clay, calculated as clay free of polylactide, on the total of clay mineral and polylactide. In one embodiment, the anionic clay is present in an amount of at least 0.5 wt. %, in particular in an amount of at least 1 wt. %. In one embodiment, the anionic clay is present in an amount of at most 15 wt. %, in particular in an amount of at most 10 wt. %, still more in particular in an amount of at most 8 wt. %. The exact amount required will depend on the effect aimed for, and on the amount of polylactide bonded to the clay mineral.

The weight-average molecular weight of the polylactide in the composition according to the invention which is not bonded to the anionic clay mineral is not especially limited, but preferably at least 10,000, more preferably at least 30,000, further preferably at least 50,000. The weight-average molecular weight of such polylactide is preferably at most 400,000. When the weight-average molecular weight is less than 10,000, mechanical properties such as strength and elastic modulus tend to become insufficient. When the weight-average molecular weight is more than 400,000, the material becomes difficult to shape.

If so desired, additional components may be present, as long as the properties of the composition are not detrimentally affected to a significant extent. Additional components that may be used include the components the presence of which in polymer compositions is known in the art. Examples include pigments, dyes, stabilisers, including UV-stabilisers, heat-stabilisers and metal-deactivation components, anti-oxidants, fillers, flame retardants, waxes, impact modifiers, plasticisers, compatibilizers, rheology modifiers, branching and cross-linking agents, anti-static agents, mould release agents, lubricants, anti-bacterial agents, and degassing agents. These optional addenda and their corresponding amounts can be chosen according to need.

In one embodiment, the polymer composition according to the invention additionally comprises a polymer selected from the group of polycarbonates, vinyl polymers, polyamides, poly(meth)acrylates, polyimides, poly(amino acids), polysaccharide-derived polymers like (modified) starches, cellulose, and xanthan, polyurethanes, polyepoxides, polyethers, polyesters and mixtures thereof.

Examples of polyesters include aliphatic polyesters like poly(butylene succinate), poly(butylene succinate adipate), poly(hydroxybutyrate), and poly(hydroxybutyrate-valerate), polyglycolide, and polycaprolactones, and aromatic polyesters like poly(ethylene terephthalate), poly(trimethylene terephthalate), poly(butylene terephthalate), and poly-(ethylene naphthalate), poly(orthoesters), and poly(ether esters) like poly(dioxanone). A further example of a suitable copolyester is Ecoflex™ of BASF.

Examples of vinyl polymers are polystyrene, poly(vinylchloride), poly(acryl amide), poly(vinyl acetate) and poly(vinylalcohol). Suitable polystyrene-based copolymers include ABS (acrylonitrile-butadiene-styrene copolymer), ASA (acrylonitrile-styrene-acrylate copolymer), and SAN (styrene-acrylonitrile copolymer).

Examples of polyethers are poly(ethylene oxide) and poly(propylene oxide).

The composition according to the invention may be manufactured in various ways.

In a first embodiment, a clay with polylactide bonded thereto is combined with a composition comprising the enantiomorph polylactide. This can be done in solution, by mixing of particulate materials, or in any other way. Where the mixing is carried out in the absence of solvent, the mixture may be heated to a temperature of, say, 160-260° C.

In a further embodiment, the composition according to the invention is manufactured by a process in which an anionic clay mineral comprising one of D-polylactide and L-polylactide bonded thereto is combined with lactide and the mixture is subjected to polymerization conditions to form polylactide. The polymerisation reaction can be carried out either using a predetermined catalyst or with no catalyst. Suitable catalysts for use in this embodiment are those known in the art for lactide polymerisation. In one embodiment, the catalyst is of the formula $(M)(X_1, X_2 \ldots X_m)_n$, where M is selected from metals of Group 2, 4, 8, 9, 10, 12, 13, 14, and 15 of the Periodic Table of Elements, $(X_1, X_2 \ldots X_m)$ are independently selected from the group of alkyls, aryls, oxides, carboxylates, halides, alkoxides, alkylesters, m is an integer ranging from 1 to 6, and n is an integer ranging from 0 to 6, wherein the values for m and n depend on the oxidation state of the metal ion.

Within Group 2 the use of Mg is preferred. Within Group 4 the use of Ti and Zr is preferred. Within Group 8 the use of Fe is preferred. Within Group 12 the use of Zn is preferred. Within Group 13 the use of Al, Ga, In, and Tl may be mentioned. Within Group 14 the use of Sn and Pb is preferred. Within Group 15 the use of Sb and Bi is preferred. In general, the use of metals of Groups 4, 14 and 15 is preferred. It is preferred for M to be selected from Sn, Pb, Sb, Bi, and Ti. The use of a Sn-based catalyst may be particularly preferred. For halides tin halides like $SnCl_2$, $SnBr_2$, $SnCl_4$, and $SnBr_4$ may be mentioned. For oxides SnO and PbO may be mentioned. Within the group of alkyl carboxylates, octoates (=2-ethyl hexanoates), stearates, and acetates may be mentioned, e.g., in the form of Sn-octoate, (also known as Sn(II) bis 2-ethyl hexanoate), Sn-stearate, dibutyltin di-acetate, butyltin tris(2-ethyl hexanoate), Sb (2-ethyl hexanoate), Bi (2-ethyl hexanoate), Sb triacetate, Na (2-ethyl hexanoate), Ca stearate, Mg stearate, and Zn stearate. Other suitable compounds include tetraphenyltin, Sb tris(ethylene glycoxide), aluminum alkoxides, and zinc alkoxides. In one embodiment, M in the above formula is a metal ion in its lowest oxidation state, where the metal ion also possesses a higher oxidation state. Preferred metal ions within this group include Sn(II), Pb(II), Sb(III), Bi (III), and Ti(II). Within this embodiment the use of a Sn(II) catalyst may be particularly preferred. For further specification of suitable catalysts within this embodiment reference is made to what has been stated above. The use of Sn(II)-bis(2-ethylhexanoate), also indicated as tin octoate, may be preferred, since this material is commercially available and soluble in liquid lactide. Further, the compound has received FDA approval. The catalyst concentration is generally at least 5 ppm, calculated as metal weight, more in particular at least 10 ppm. The catalyst concentration is generally at most 1300 ppm, in particular at most 500 ppm. The reaction temperature in the polymerization step is preferably about 100 to 240° C., more in particular in the range of 160-220° C.

The present invention also pertains to a method for manufacturing a shaped article. This method comprises the steps of melting the composition according to the invention, which has been extensively discussed above, shaping the molten material, and solidifying the polylactide.

In this process, the melting temperature applied is generally at least 140° C., in particular at least 160° C. If the temperature is too low, the processability of the composition may be insufficient. The melting temperature generally is at most 280° C., in particular at most 250° C. If the temperature is too high, the polymer may suffer from degradation.

Depending on the type of shaping process applied, the retention time at the melting temperature is preferably 0.1 to 30 min. Where the retention time is too low, the polylactide may not have been sufficiently melted. Where the retention time is longer than required, the properties of the polymer may be unnecessarily affected.

The polylactide is solidified by cooling it below the melting temperature, e.g. to a temperature in the range of 20 to 160° C. In one embodiment, the polylactide is solidified by cooling it down to a temperature between the glass transition temperature of the composition and the melting point of the non-bonded polylactide. Preferred solidification temperatures for the production of semi-crystalline polylactide compositions are 60-160° C., more in particular 80-140° C.

The shaping technique applied in the present invention is not especially limited.

In one embodiment, the step of shaping the molten material is carried out by bringing it into a mould, and solidifying the molten material in the mould. Where a mould is used, conventional processes can be applied, e.g., injection moulding, extrusion moulding, blow moulding, inflation moulding, profile extrusion moulding, injection-blow moulding, vacuum-pressure moulding, and the like can suitably be used.

In another embodiment, the step of shaping the molten material is carried out by subjecting it to a film-forming step, and solidifying the molten material in the form of a film.

In a further embodiment, the step of shaping the molten material is carried out by subjecting it to a thermoforming process, and solidifying the molten material in the form provided by the thermoforming process.

In a further embodiment, the step of shaping the molten material is carried out by subjecting it to a melt-spinning step and solidifying it to form a fibre. The fibre can be used to manufacture threads, and in woven- and non-woven applications.

In a further embodiment, the step of shaping the molten material is carried out by subjecting it to a foaming step, and solidifying the molten material in the form of a foam.

In a further embodiment, the step of shaping the molten material is carried out via a particle formation process, such as via extrusion, beading, or pelletising, followed by solidifying the molten material in the form of particles, e.g., formed via a cutting process, using an underwater pelletiser, or a strand pelletiser, or by any other process known in the art.

As indicated before, the advantage of the process according to the invention is that the presence of the enantiomorph nucleating agent on an anionic clay results in an increased crystallisation velocity, in particular of the preferred, high melting combinations of poly-D-lactic acid and poly-L-lactic acid, as compared to the system not containing the nucleating agent. It is also advantageous over the system containing a nucleating agent bonded to a cationic clay, because, as has been explained above, this results in less contaminants in the system, and an improved manufacturing system.

The present invention also pertains to a shaped article comprising a composition comprising of one of poly-D-lactide and poly-L-lactide bonded to an anionic clay mineral and the other of poly-D-lactide and poly-L-lactide not bonded to the anionic clay mineral, the polylactide bonded to the anionic clay mineral comprising on average at least 6 lactyl units. The shaped article may be formed in any manner. Reference is made to the shaping processes discussed above.

In the following, a number of preferred embodiments of the present invention will be discussed. The invention should in no way be considered limiting thereto or thereby.

In one embodiment of the present invention, a meixnerite is provided which is intercalated with poly-D-lactide. The meixnerite is combined with poly-L-lactide in an amount of, for example 1-15 wt. %, by mixing. The resulting mixture is processed via melt-processing to form a shaped article.

In a further embodiment of the present invention, a meixnerite is provided which is intercalated with poly-D-lactide. The meixnerite is combined with a 50:50 mixture of poly-D-lactide and poly-L-lactide in an amount of, for example 1-15 wt. %, by mixing. The poly-D-lactide and poly-L-lactide each have an optical purity of at least 85%, in particular at least 90%, still more in particular at least 95%. The resulting mixture is processed via melt-processing to form a shaped article.

In a further embodiment of the present invention, a hydrotalcite is provided intercalated with poly-D-lactide. The material is combined with L-lactide, and the L-lactide is polymerised in the presence of Sn-octoate, to form poly-L-lactide, with a hydrotalcite intercalated with poly-D-lactide dispersed therein.

The invention claimed is:

1. A polymer composition comprising one of poly-D-lactide and poly-L-lactide bonded to an anionic clay mineral and the other of poly-D-lactide and poly-L-lactide not bonded to the anionic clay mineral.

2. The polymer composition according to claim 1, wherein the composition comprises as polylactide not bonded to the anionic clay a mixture of poly-D-lactide and poly-L-lactide.

3. The polymer composition according to claim 2, wherein in the mixture of poly-D-lactide and poly-L-lactide the ratio between the two enantiomorphs is between 90:10 and 10:90.

4. The polymer composition of claim 1, wherein the polylactide bonded to the anionic clay is poly-D-lactide and the polylactide non bonded to the anionic clay is poly-L-lactide.

5. The polymer composition of claim 1, wherein the composition comprises PLA stereocomplexes with a melting point of at least 190° C.

6. The polymer composition according to claim 1, wherein the one of poly-D-lactide and poly-L-lactide bonded to the anionic clay mineral has a TADP of at least 6 expressed as lactyl-units.

7. The polymer composition according to claim 1, wherein the anionic clay mineral is a hydrotalcite or a meixnerite.

8. The polymer composition according to claim 1, wherein the anionic clay mineral has a distance between the layers of the anionic clay of at least 1.0 nm.

9. The polymer composition according to claim 1, which additionally comprises a polymer selected from the group of polycarbonates, polyesters, polyvinyl polymers, poly(meth)acrylates, polyamides, polysaccharide-derived polymers and mixtures thereof.

10. A process for manufacturing a polymer composition according to claim 1, wherein an anionic clay mineral comprising one of poly-D-lactide and poly-L-lactide bonded thereto is combined with a composition comprising the other of poly-D-lactide and poly-L-lactide, or with a lactide precursor therefor, wherein, if a lactide precursor is used, the mixture is subsequently subjected to polymerization conditions to form polylactide.

11. A process according to claim 10, wherein a lactide precursor is used and a polymerisation catalyst is present in the mixture when it is subjected to polymerisation conditions.

12. A method for manufacturing a shaped article comprising the steps of melting a polymer composition according to claim 1, shaping the composition, and solidifying the composition after shaping.

13. A method according to claim 12, wherein the step of shaping the molten material is carried out by bringing the material into a mould, and solidifying the molten material in the mould, or by subjecting the material to a film-forming step, and solidifying the molten material in the form of a film.

14. A method according to claim 11, wherein the step of shaping the molten material is carried out by subjecting it to a thermoforming process, and solidifying the molten material in the form provided by the thermoforming process.

15. Shaped article comprising a polymer composition comprising of one of poly-D-lactide and poly-L-lactide bonded to an anionic clay mineral and the other of poly-D-lactide and poly-L-lactide not bonded to the anionic clay mineral.

* * * * *